United States Patent [19]
Manizza

[11] Patent Number: 4,579,276
[45] Date of Patent: Apr. 1, 1986

[54] COMBINED BAKING AND DISPLAY TRAY

[75] Inventor: Guelfo A. Manizza, Blauvelt, N.Y.

[73] Assignee: Federal Paper Board

[21] Appl. No.: 587,966

[22] Filed: Mar. 9, 1984

[51] Int. Cl.[4] ............................................. B65D 5/48
[52] U.S. Cl. ........................................ 229/15; 229/27; 229/30; 426/113
[58] Field of Search .................. 229/15, 27, 30, 32, 229/6 R, 16 R; 206/565, 814; 426/113, 120, 124, 128; 249/128, 129, 134, 154, 160; 99/426; 220/22

[56] References Cited

U.S. PATENT DOCUMENTS

| | | | |
|---|---|---|---|
| 386,952 | 7/1888 | Altfather | 206/561 X |
| 1,538,892 | 5/1925 | Gaylord | 229/29 B |
| 1,890,951 | 12/1932 | Sherman | 229/15 X |
| 1,980,667 | 11/1934 | Daley | 229/32 X |
| 2,605,041 | 7/1952 | Welshenbach | 229/16 R X |
| 3,174,674 | 3/1965 | Wagner | 229/32 |
| 3,325,078 | 6/1967 | Bach | 229/15 |
| 3,519,191 | 7/1970 | Royce | 229/15 X |
| 3,536,246 | 10/1970 | Rosen | 229/15 X |
| 3,702,170 | 11/1972 | Adams | 229/15 |
| 4,081,125 | 3/1978 | Meyers | 229/15 X |
| 4,279,374 | 7/1981 | Webinger | 426/113 X |

FOREIGN PATENT DOCUMENTS

| | | | |
|---|---|---|---|
| 561252 | 8/1952 | Canada | 229/15 |
| 2105726 | 4/1972 | France | 229/15 |
| 2247093 | 5/1975 | France | 229/15 |
| 2408525 | 7/1979 | France | 229/27 |
| 2498562 | 7/1982 | France | 229/15 |
| 2521527 | 8/1983 | France | 229/15 |
| 588741 | 6/1947 | United Kingdom | 229/15 |
| 1016314 | 1/1966 | United Kingdom | 229/15 |
| 1086551 | 10/1967 | United Kingdom | 99/426 |
| 1187872 | 4/1970 | United Kingdom | 229/16 R |

Primary Examiner—William Price
Assistant Examiner—Gary E. Elkins
Attorney, Agent, or Firm—Charles E. Brown; Charles A. Brown

[57] ABSTRACT

This relates to a combined baking and display tray for crescent shaped bakery products. The tray is generally rectangular and is provided with a divider dividing the tray into crescent shaped compartments or areas for receiving the rolled dough and for retaining the dough in its curved crescent shape during baking.

7 Claims, 3 Drawing Figures

COMBINED BAKING AND DISPLAY TRAY

This invention relates in general to new and useful improvements in combined baking and display trays, and more particularly to a tray particularly adapted for baking arcuate or crescent shaped products, especially croissants.

Crescent shaped bakery products, such as croissants, are formed of rolled dough and initially have a straight outline. However, they are curved and must be maintained in that curved or crescent shape during baking. This invention particularly relates to a combined baking and display tray which has therein a divider dividing the tray into crescent shaped compartments or areas for receiving the rolled dough and for retaining it in its curved or crescent shape.

One of the features of the invention is the construction of the divider which may be formed from a flat blank having side rails with there extending between the side rails cross bars. The cross bars are so hingedly connected to the side rails along fold lines that when the side rails and cross bars are rotated from the plane of the blank, the side rails will be normal to the original plane of the blank and the cross bars will also be upstanding and extending between the side rails.

Further, when the side rails are moved together, the cross bars will automatically assume arcuate positions.

The tray may be of a simple rectangular construction and will have depending feet so as to space it above the floor to an oven in which the croissants or other bakery products are to be baked. The tray will have side walls which are taller than the side rails of the divider whereby locking tabs may be readily folded inwardly to overlie the side rails and hold the divider within the tray.

The side rails may be of the same length as the tray so as to readily position the divider. On the other hand, if the side rails are to be shorter than the tray, then the side rails may be provided with depending ears which project down through openings formed in the bottom of the tray in defining the feet of the tray.

It is to be understood that both the tray and the divider are to be formed of ovenable paperboard.

With the above and other objects in view that will hereinafter appear, the nature of the invention will be more clearly understood by reference to the following detailed description, the appended claims, and the several views illustrated in the accompanying drawings.

Figure 1:
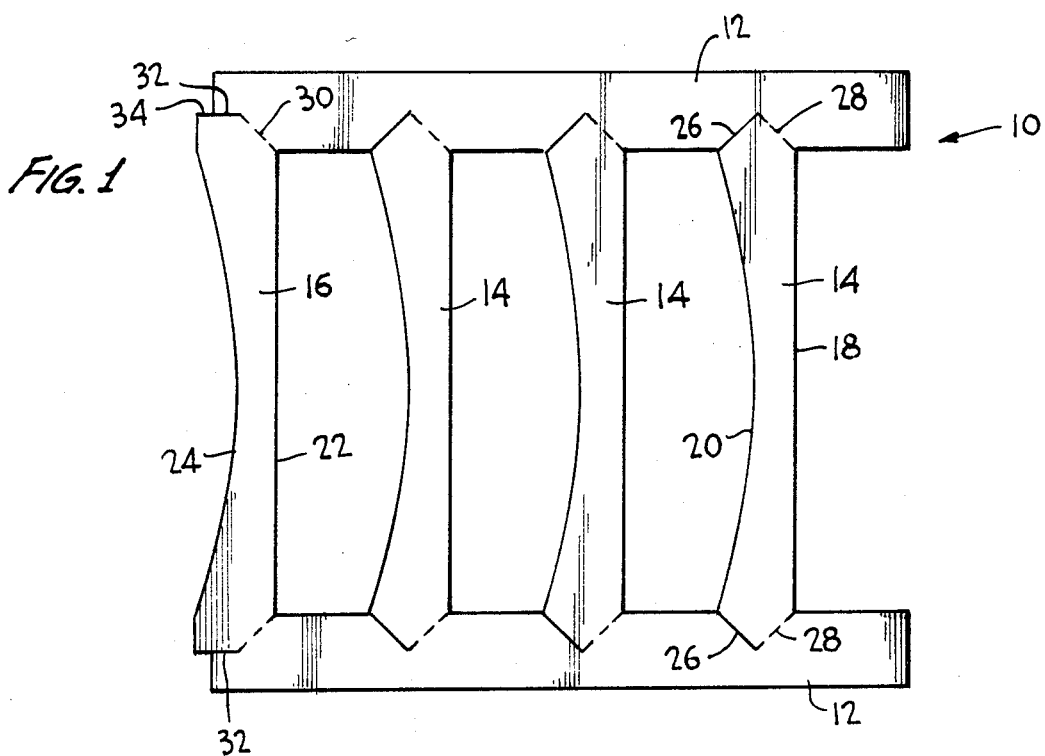
FIG. 1 is a plan view of a blank for forming a divider in accordance with this invention.

Reference is first made to FIG. 1 wherein there is illustrated a blank for forming a divider in accordance with this invention, the blank being generally identified by the numeral 10. The blank 10 is cut to define a pair of elongated side rails 12 and a plurality of transversely extending cross bars 14 and a terminal cross bar 16. Each of the cross bars 14 has a straight edge 18 and a curved edge 20 so as to be of minimum width at the center thereof. The same is true of the cross bar 16 which has a straight edge 22 and a curved edge 24.

Each of the cross bars 14 is separated from a respective side rail 12 by a diagonal cut line 26 which terminates in an inner section with a diagonal fold line 28.

The connection between the cross bar 16 and the side rails 12 is somewhat different from the connection between the cross bars 14 and the side rails 12. The cross bar 16, however, connected to each of the side rails 12 along a diagonal fold line 30. However, the cross bar 16 is preferably separated from each side rail 12 along a longitudinal cut line 32 and has an end 34 which is an extension of the cut line 32 and extends beyond each side rail 12.

In use, the blank 10 is folded to define a divider, generally identified by the numeral 36. In the divider 36, both the side rails 12 and the cross bars 14 and 16 have been rotated out of the original plane of the blank 10. The side rails 12 are upstanding and are parallel to one another. The cross bars 14 and 16 are also upstanding and extend generally normal to the side rails 12. The side rails 12 have been moved together so that each of the cross bars 14, 16 bow, all of the cross bars bowing in the same direction.

Figure 2:
FIG. 2 is a perspective view showing the formed divider.

In will be seen from FIG. 2 that each of the cross bars 14 has an end portion 38 which generaly lies flat against a respective side rail 12. The cross bar 16 also has an end portion 40 which generally lies flat against the respective side rail 12.

Figure 3:
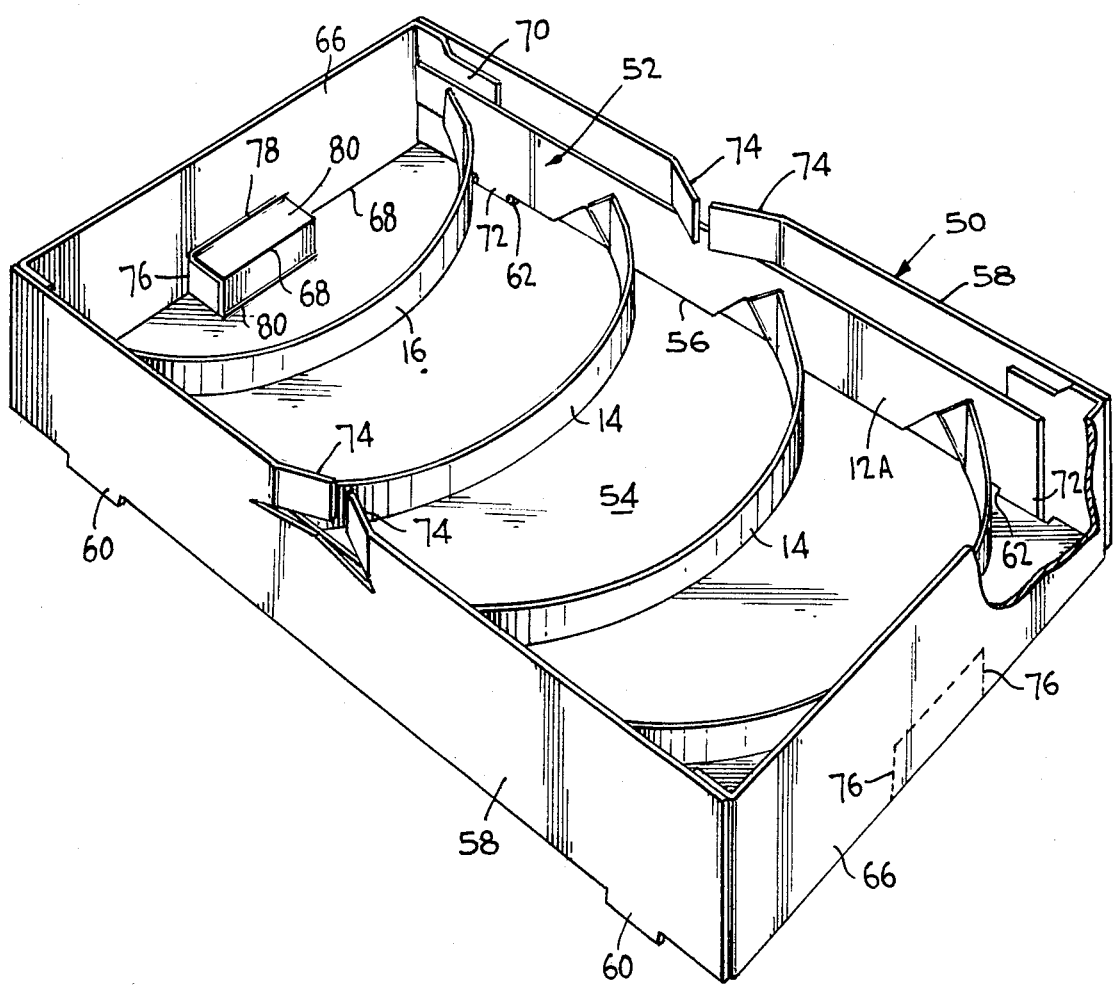
FIG. 3 is another perspective view showing a combined baking and display tray having therein a divider in accordance wth this invention, the divider being slightly different from that of FIG. 2.

Reference is now made to FIG. 3 wherein there is illustrated specifically the details of a combined baking and display tray generally identified by the numeral 50. The tray 50 is particularly adapted to have received therein the divider 36 or a somewhat similar divider which is shown in FIG. 3 and is identified by the numeral 52.

The tray 50 includes a bottom wall 54 having folded relative thereto along fold lines 56 and extending upwardly therefrom a pair of sides 58. Each of the sides 58 is provided with a pair of depending feet 60, the feet 60 being cut from the material of the bottom 54 to define notches 62.

The tray 50 also includes a pair of end walls 66 which are also integral with the bottom wall 66 and folded relative thereto along fold lines 68 so as to be upstanding.

Each of the end walls 66 is provided with a flap which is disposed inwardly of each of the side walls 38 at each end thereof and is suitably adhesively secured thereto to complete the tray 50.

At this time, it is pointed out that the divider 52 illustrated within the tray 50 is different from the divider 36 only in that the side rails 12A of the divider 52 are shorter than the sides 12 of the divider 36. This requires less material for the formation of the divider. However, each of the side rails 12A is provided with a pair of positioning ears 72 which extend down through the notches 62 along side the feet 60 to position the divider therein.

It is also to be noted that the height of the side rails 12 or 12A is less than that of the side walls 58. Thus the dividers 36 and 52 may be retained within the tray by simple locking tabs 74 which are formed from the side walls 58 above the side rails 12A with the locking tab 74 being pressed inwardly in overlying relation to the side rails 12A.

A further feature of the tray 50 is that each of the end walls 66 is provided with a pair of rupturable weakening lines 76, which weakening lines also extend into the bottom 54. The ends of the weakening lines 76 which extend into the end walls 66 are connected by a fold line 78 while the ends of the weakening lines 76 which extend into the bottom 54 are connected by a fold line 80.

After the divider has been placed within the tray, the appropriate end of the tray 50 may be modified by pressing the material of the respective end wall and the bottom inwardly to form a projection 80. This projection cooperates with the respective cross bar to define an arcuate space in association with the cross bar 16.

It is to be understood that the cross bars 14, 16 have a central portion of a lesser height than the end portions so that the croissants or other crescent shaped bakery products being baked within the tray will be less shielded from the heat of the oven by the cross bars 14, 16.

It is to be understood that in the baking of croissants, for example, the shaped dough is placed within each of the pockets defined by the cross bars 14, 16 with the dough having been formed to a crescent shape from an original straight shape. The dividers 36, 52 will retain the crescent shape of the croissants during baking. After the baking has been completed, the trays, with the dividers and croissants therein, will be removed from the oven, permitted to cool to the desired degree and then wrapped. Thus the tray 50 may be utilized as a display tray. At the same time the divider retains the croissants separated from one another so that they will not strike each other and cause each other to crumble during shipment and handling.

Although only a preferred embodiment of the tray and only two forms of dividers have been specifically illustrated and described herein, it is to be understood that minor variations may be made in the divider and tray without departing from the spirit of the invention as defined by the appended claims.

I claim:

1. A divider for a combined baking and display tray for dividing said tray into a plurality of crescent shaped compartments, said divider being formed from a flat blank defining a pair of transversely spaced side rails and a plurality of transverse cross bars extending between and integrally connected to said side rails, each end of each of said cross bars extending into a respective one of said side rails and being separated therefrom along a cut line and a fold line, said side rails and said cross bars being folded relative to each other to be normal to the plane of said flat blank, said side rails being closer together than when in said blank, and said cross bars being arcuate in plan to form a plurality of crescent shaped compartments.

2. A divider according to claim 1 wherein said divider is seated in a tray having sides and ends, and said side rails are in touching relation to inner faces of said sides.

3. A divider according to claim 2 wherein said cross bars are all curved in the same direction generally facing one of said tray ends.

4. A divider according to claim 2 wherein said cross bars are all curved in the same direction generally facing one of said tray ends, and there is at the other of said tray ends a projection for maintaining the shape of an adjacent crescent shaped article.

5. A divider according to claim 4 wherein said projection is in part formed from said tray.

6. A divider according to claim 2 wherein said side rails substantially conform in length of that of said tray sides to longitudinally position said divider in said tray.

7. A divider according to claim 1 wherein end portions of said cross bars are flat and lie directly against said side rails.

* * * * *